United States Patent [19]
Matsuno

[11] Patent Number: 5,826,209
[45] Date of Patent: Oct. 20, 1998

[54] DRIVING FORCE CONTROL SYSTEM FOR VEHICLE AND THE METHOD THEREOF

[75] Inventor: Koji Matsuno, Gunma Pref., Japan

[73] Assignee: Fuji Jukogyo Kabushiki Kaisha, Tokyo, Japan

[21] Appl. No.: 827,166

[22] Filed: Mar. 27, 1997

Related U.S. Application Data

[62] Division of Ser. No. 489,786, Jun. 13, 1995, Pat. No. 5,734,595.

[30] Foreign Application Priority Data

Jun. 27, 1994 [JP] Japan ................................. 6-144657

[51] Int. Cl.$^6$ ................................................. B60K 17/348
[52] U.S. Cl. ............................... 701/69; 701/84; 180/248
[58] Field of Search ................................. 701/69, 82, 84, 701/87, 88, 89; 303/140, 143, 146, 190; 180/197, 248

[56] References Cited

U.S. PATENT DOCUMENTS

| | | | |
|---|---|---|---|
| 4,718,685 | 1/1988 | Kawabe et al. | 280/91 |
| 4,773,012 | 9/1988 | Ito et al. | 364/424.01 |
| 4,840,389 | 6/1989 | Kawabe et al. | 280/91 |
| 5,197,008 | 3/1993 | Itoh et al. | 364/426.01 |
| 5,245,542 | 9/1993 | Itoh et al. | 364/426.029 |
| 5,265,020 | 11/1993 | Nakayama | 364/424.05 |
| 5,287,279 | 2/1994 | Anan | 364/426.032 |
| 5,417,298 | 5/1995 | Shibahata | 180/76 |
| 5,446,657 | 8/1995 | Ikeda et al. | 364/424.05 |

FOREIGN PATENT DOCUMENTS

5-338461  12/1993  Japan .

*Primary Examiner*—Michael Zanelli
*Attorney, Agent, or Firm*—Martin A. Farber

[57] ABSTRACT

In a driving force control system for a vehicle, an angular velocity of the course direction of the vehicle body is calculated. On the other hand, a target angular velocity of the course direction is determined based on a steering angle and a vehicle speed. Then, based on the degree of the deviation of the calculated angular velocity from the target angular velocity, a correction coefficient for reducing an engine power is generated. When the vehicle traces off the course in the marginal condition on the low friction coefficient road, the correction coefficient reduces the engine power to prevent the vehicle from going out of the course.

13 Claims, 4 Drawing Sheets

DRIVING FORCE CONTROL SYSTEM FOR VEHICLE AND THE METHOD THEREOF

RELATED APPLICATION

This application is a divisional application of my application Ser. No. 08/489,786 filed Jun. 13, 1995, now U.S. Pat. No. 5,734,595.

BACKGROUND OF THE INVENTION

1. Field of the Invention

The present invention relates to a control system for controlling a driving force of a vehicle and particularly to a control system for controlling the driving force so as to trace its projected course in the marginal region by employing an angular velocity of course direction as a control parameter.

2. Prior Art

Generally, in a linear region where a tire grip is sufficiently secured, the behavior of a vehicle during a turning acceleration can be analyzed according to a vehicular motion model. In this state, within a small lateral slip angle, for example up to around 3 degrees, the vehicle turns smoothly with a lateral movement corresponding to a yawing of the vehicle. However, in a running condition where a tire grip reaches a limit, such as running on a road with low friction coefficient of road surface, the vehicular motion model can not be applied to by itself and therefore the relationship between the yawing and the lateral movement of the vehicle as mentioned above is not established. In this marginal state, for example in case of a front wheel drive vehicle, the vehicle shows such an awkward behavior that it drifts out, namely, its tracing expands outwardly due to a side slip of the front wheels when its driving force is too large. Accordingly, in the driving force control techniques it is important how to secure a stability and a maneuvability in the marginal state on the low friction coefficient road as mentioned above.

With respect to the technique for controlling a vehicular behavior in the marginal region where a tire characteristic can not be approximated to a linear expression, for example, there is a technique disclosed in Japanese Unexamined Patent Application Toku-Gan-Hei 4-179207. This patent application proposes a technique in which cornering powers of front and rear wheels are determined according to the differences between a target yaw rate and an actual yaw rate and between a target lateral acceleration and an actual lateral acceleration, then a slip angle of the vehicle body is obtained based on the equation of motion parameterizing these cornering powers by extendedly applying the slip angle to the marginal region and thus the driving force is controlled according to the torque distribution ratio corresponding to this estimated slip angle.

However, in the prior art control system described above, since the driving force is controlled based on an estimated slip angle of the vehicle body in the marginal region, there is a disadvantage that the control system is ineffective in a case where the vehicle drifts out regardless of a turn of the steering wheel.

SUMMARY OF THE INVENTION

Accordingly, the present invention is intended to obviate the disadvantage of the known driving force control system. It is an object of the present invention to provide a driving force control system for a vehicle capable of tracing the intended course of the vehicle under any driving conditions.

To achieve the above object the driving force control system for a vehicle according to the present invention comprises directional angular velocity calculating means, deviation calculating means, tire characteristic control means, target directional angular velocity determining means, correction coefficient generating means and a fuel injection control apparatus.

The directional angular velocity calculating means calculate a target yaw rate, a target lateral acceleration and estimate a directional angular velocity by solving equations of motion of the vehicle. The parameters necessary for solving the equations of motion are supplied from a steering angle sensor and a vehicle speed sensor. Further, in solving the equations of motion, cornering powers of front and rear wheels are important parameters and these are supplied from tire characteristic control means described hereinafter.

The deviation calculating means calculate a deviation of the target yaw rate from the actual yaw rate based on the target yaw rate and the actual yaw rate and a deviation of the target lateral acceleration from the actual lateral acceleration based on the target lateral acceleration and the actual lateral acceleration. These actual yaw rate and lateral acceleration data are detected by a yaw rate sensor and a lateral acceleration sensor respectively and supplied to the deviation calculating means.

The object of the tire characteristic control means is to estimate a cornering power of the front and rear wheels based on the above deviation of the target yaw rate from the actual yaw rate and the one of the target target lateral acceleration from the actual lateral acceleration.

The target directional angular velocity determining means determine a target directional angular velocity by using the equations of motion parameterizing the steering angle, the vehicle speed, a predetermined cornering power of front and rear wheels. These predetermined cornering powers are obtained from the equivalent cornering powers of a tire on the road with a high friction coefficient of road surface.

The correction coefficient generating means act as generating a correction coefficient for reducing the engine power. The correction coefficient is determined according to the degree of difference between the directional angular velocity and the target directional angular velocity.

The fuel injection control apparatus controls a fuel injection amount injected from the fuel injector of the engine based on the correction coefficient so as to control the driving force applied to the drive wheel.

In the vehicle (in this embodiment a front wheel drive vehicle) equipped with the driving control system according to the present invention constituted above, the state of the vehicular course accompanied by behavior changes is watched by the calculated yaw rate, lateral acceleration and directional angular velocity based on the actual yaw rate, actual lateral acceleration and estimated cornering powers of front and rear wheels. When the vehicle shows a marginal behavior such as a drift-out during a turn on the low friction coefficient road, based on the deviation between the calculated yaw rate and the actual yaw rate and the deviation between the calculated lateral acceleration and the actual lateral acceleration, the cornering powers of front and rear wheels are estimated with high accuracy according to the state of the marginal behavior of the vehicle.

Further, in the directional angular velocity calculating means, the directional angular velocity is estimated according to the deviation of the vehicular trace from its intended course in the marginal behavior of the vehicle. Further, in the target directional angular velocity determining means the target directional angular velocity is determined based on the steering angle and the vehicle speed on the basis of the cornering characteristic of the vehicle on the high friction coefficient road and in the correction coefficient generating means, the correction coefficient for reducing the engine power is determined according to the degree of the deviation of the directional angular velocity from the target directional angular velocity, that is, according to the degree of the vehicular deviation from its intended course. Finally, in the fuel injection control apparatus, the amount of fuel injected from the fuel injector is reduced according to the magnitude of the correction coefficient. As a result of this, the lateral force on the front wheel is reduced and the drift-out phenomenon is effectively prevented, thereby the traceability of the vehicle can be secured.

BRIEF DESCRIPTION OF THE DRAWINGS

The present invention will be understood more fully from the accompanying drawings of the preferred embodiment of the invention.

In the drawings.

DETAILED DESCRIPTION OF THE PREFERRED EMBODIMENTS

Figure 2:
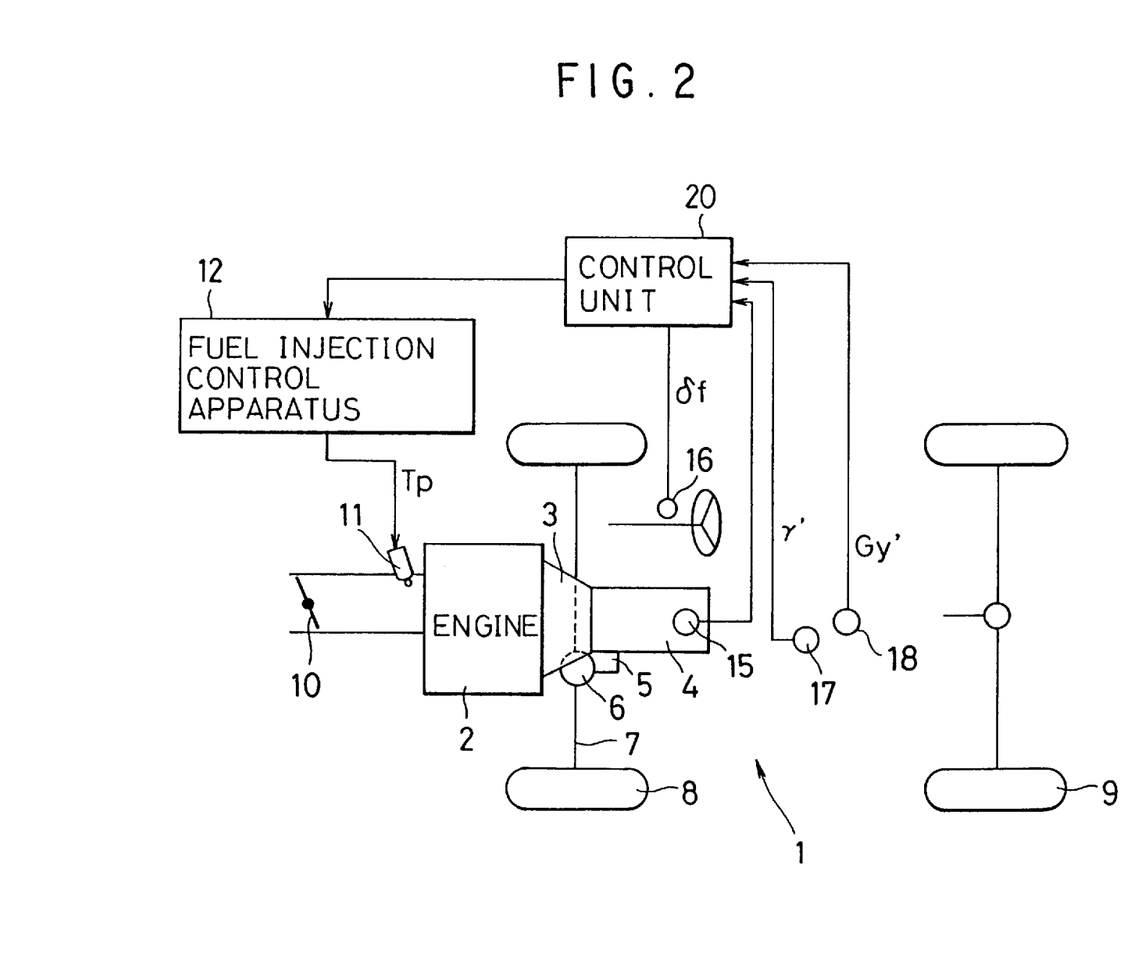
FIG. 2 is a schematic diagram showing a vehicle (front wheel drive vehicle) which installs a driving force control system according to the present invention.

Referring now to FIG. 2, numeral 1 denotes a vehicle (in this embodiment, a front wheel drive vehicle is shown) and an engine 2 is installed at the front side of the vehicle 1. The engine 2 is connected with a transmission 4 through a clutch 3. A drive shaft 5 of the transmission 4 is connected with a front wheels 8 through a differential apparatus 6 and a wheel axle 7 so as to transmit power to the front wheels 8. At the rear side of the vehicle 1 rear wheels 9 are disposed. As driving force control means, a fuel injector 11 is equipped with the engine 2 at the downstream portion of a throttle valve 10 in the intake system of the engine 2 so as to control an output power of the engine 2 by a fuel injection amount signal Tp which is transmitted from a fuel injection control apparatus 12 to the fuel injector 11.

On the other hand, the vehicle 1 has a vehicle speed sensor 15 for detecting a vehicle speed V, a steering angle sensor 16 for detecting a steering angle $\delta f$, a yaw rate sensor 17 for detecting an actual yaw rate $\tau'$ and a lateral acceleration sensor 18 for detecting an actual lateral acceleration Gy'. The signals from these miscellaneous sensors are inputted to a control unit 20 and processed therein.

Next, an electronic control system of this embodiment will be described. Before specific descriptions of the electronic control system, it will be helpful in understanding the present invention to describe the basic principle of the control.

It is well known that a turning performance or course-traceability of a vehicle is largely dependent upon the change of friction coefficient of road surface. When the friction coefficient of road surface becomes low and reaches around a limit of tire grip, the lateral force of the tire is lowered according to the theory of a circle of friction. If this lowering of lateral force of tire is deemed as a lowering of cornering powers Kf, Kr of the front and rear wheels, a vehicular motion model of a linear region can be extendedly applied to a marginal region. That is to say, a yaw rate $\tau$ and a lateral acceleration Gy are calculated by solving equations of vehicular motion based on a steering angle $\delta f$ and a vehicle speed V and then a deviation $\Delta \tau$ of the yaw rate $\tau$ from an actual yaw rate $\tau'$ and a deviation $\Delta G$ of the lateral acceleration Gy from an actual lateral acceleration Gy' are calculated respectively. Based on these deviations $\Delta \tau$ and $\Delta G$, the cornering powers Kf, Kr of the front and rear wheels can be estimated with high accuracy according to vehicle behavior in the marginal region. Details of these calculation processes are described in Japanese Patent Application No. Toku-Gan-Hei 4-179207.

Figure 5:
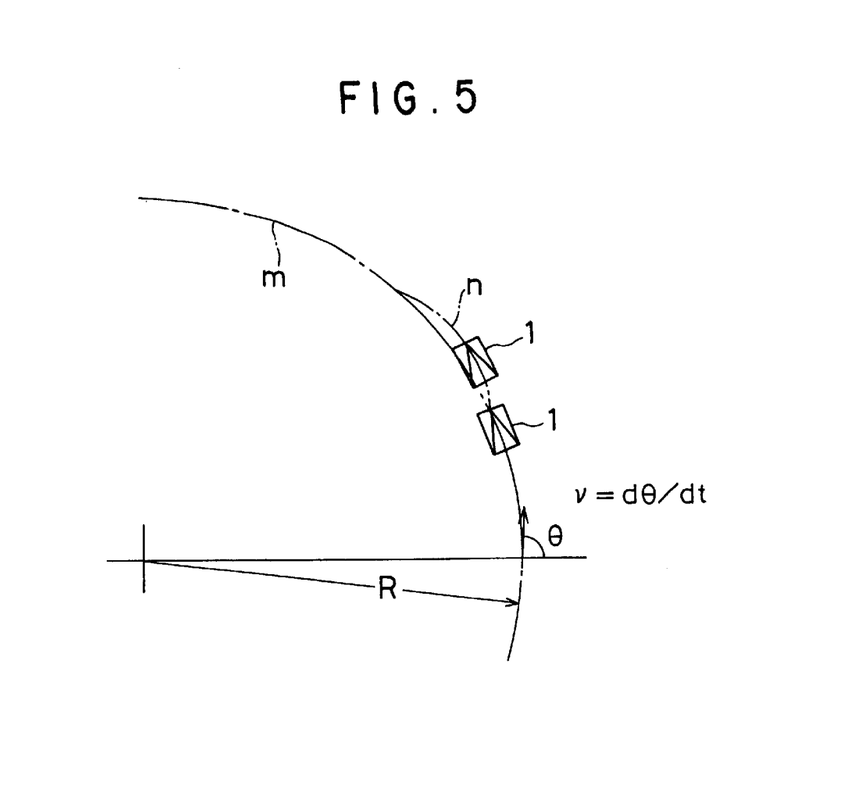
FIG. 5 is a diagram showing a trace brought about by a vehicle turning a circle.

Among variables of state indicating a course-traceability of the vehicle 1, there is an angular velocity of course direction v (hereinafter referred to as directional angular velocity v). The directional angular velocity v is a value obtained by differentiating an angle of course direction $\theta$ according to a trace of the vehicle 1 turning with a radius R, as shown in FIG. 5 and is expressed as a function of an inverse number 1/R of the turning radius R, the vehicle speed V, the lateral acceleration Gy and the yaw rate $\tau$. Accordingly, the value of the directional angular velocity v does not change as far as the vehicle is not apart from the reference circle, even if a change occurs in the behavior of the vehicle during turning on a low friction coefficient road, however, once the vehicle gets out of the reference circle, namely, when the vehicle goes away outwardly, that value is reduced and when it goes away inwardly, the value is increased. That is to say, the change of the directional angular velocity v indicates a state of the deviation from the course of the vehicle. Thus, the course-traceability of the vehicle can be improved by watching the directional angular velocity v.

Next, it will be described how the directional angular velocity v is calculated.

First, referring to FIGS. 3a and 3b, the movement of the point P of a center of gravity will be described. Here, a coordinate system fixed to ground is designated as X–Y and the one fixed to the vehicle is designated as x–y. Angles around a vertical axis are defined positive, if anticlockwise and negative, if clockwise. Assuming that the vehicle travels at constant speed, a velocity vector of the point P is expressed as follows:

(Formula 1)

$$\dot{R} = ua + vb \qquad (1)$$

where R; a position vector at the point P in the coordinate plane X–Y, a; a unit vector in the x direction, b; a unit vector in the y direction, u; a velocity component in x direction, v; and a velocity component in y direction.

Figure 3A:
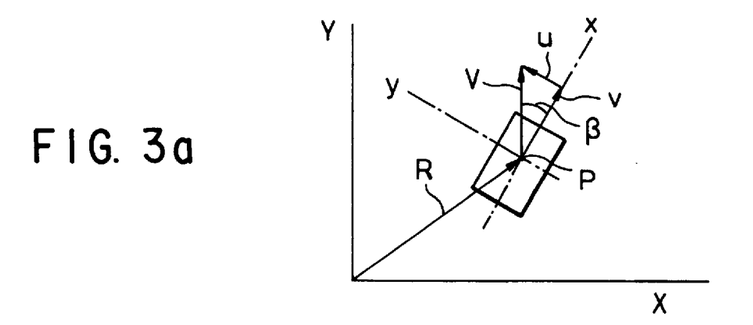
FIGS. 3a, 3b, and 3c are diagrams showing motion of a vehicle and a two-wheel vehicle model.
Figure 3B:
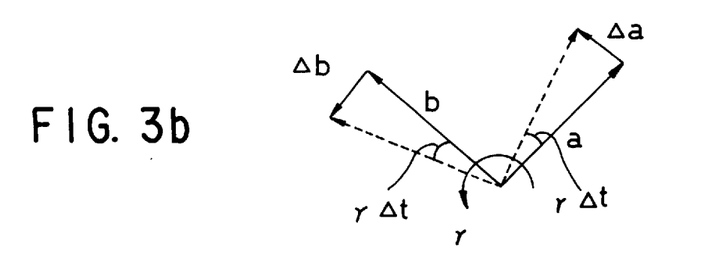

An acceleration vector of the point P is expressed as follows:

(Formula 2)

$$\ddot{R} = \dot{u}a + u\dot{a} + \dot{v}b + v\dot{b} \qquad (2)$$

Where $\Delta a$, $\Delta b$ are deviation amounts for a $\Delta t$ second and $\tau$ denotes a yaw rate of the vehicle, as shown in FIG. 3a since $\Delta a = \tau \Delta t b$, $\Delta b = -\tau \Delta t a$, the velocity vector of a, b is expressed as follows:

(Formula 3)

$$\dot{a} = \tau b, \quad \dot{b} = -\tau a \quad (3)$$

Therefore, the acceleration vector of the point P is as follows:
(Formula 4)

$$\ddot{R} = (\dot{u} - v\tau)a + (\dot{v} + u\tau)b \quad (4)$$

Since the vehicle travels at the constant speed, a vehicle speed V is constant. In this case, the motion of the point P is expressed as follows using a side slip angle β (β is small):
(Formula 5)

$$u = V \cos\beta \approx V, \quad v = V \sin\beta \approx V\beta$$

$$\dot{u} = -V \sin\beta \cdot \dot{\beta} = -V\beta\dot{\beta},$$

$$\dot{v} = V \cos\beta \cdot \dot{\beta} = v\dot{\beta} \quad (5)$$

Substitution of the equations (5) into the equation (4) gives the following equation:
(Formula 6)

$$\ddot{R} = -V(\dot{\beta} + \tau)\beta a + V(\dot{\beta} + \tau)b \quad (6)$$

Further, if the side slip angle β is small, the equation (6) is expressed as follows.
(Formula 7)

$$\ddot{R} \approx V(\dot{\beta} + \tau)b$$

That is to say, the center of gravity of the vehicle P can be regarded to have an acceleration whose direction is perpendicular to the direction in which the vehicle travels and the acceleration is determined by the vehicle speed V, the change of side slip angle β and the yaw rate τ. Hence, the lateral acceleration Gy and the directional angular velocity ν are calculated according to the following equation (8).
(Formula 8)

$$Gy = V(\dot{\beta} + \tau) = V\nu$$

Figure 3C:
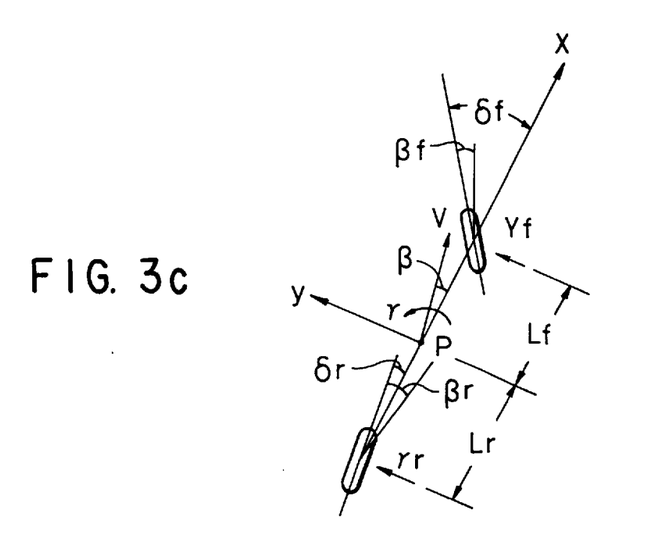

By use of a two wheel vehicle model shown in FIG. 3c, an equation of motion when the vehicle turns around a fixed circle will be described.

Following equations whose variables are the side slip angle β and the yaw rate τ are established.
(Formula 9)

$$mV(\dot{\beta} + \tau) = Yf + Yr \quad (9)$$

$$I\dot{\tau} = LfYf - LrYr \quad (10)$$

where m; a vehicle mass, V; a vehicle speed, I; an inertia of yaw moment, Yf, Yr; a cornering force of front and rear wheels respectively and Lf, Lr; a distance from the center of gravity to the center of front and rear wheels respectively.

In the region where the cornering forces Yf, Yr can be treated as being in a linear relationship with the tire slip angles βf, βr, using the equivalent cornering powers Kf, Kr, the cornering forces Yf, Yr are expressed as Yf=2Kfβf, Yr=2Krβr. Substituting these into the equations (9) and (10), the following equations are obtained.
(Formula 10)

$$mV(\dot{\beta} + \tau) = 2Kf(\delta f - \beta - Lf\tau/V) + 2Kr(\delta r - \beta + Lr\tau/V) \quad (11)$$

$$I\dot{\tau} = 2LfKf(\delta f - \beta - Lf\tau/V) + 2LrKr(\delta r - \beta + Lr\tau/V) \quad (12)$$

where δf; a steering angle.

By using these three equations (8), (11) and (12), the yaw rate τ, the lateral acceleration Gy and the directional angular velocity ν are calculated.

Figure 1:
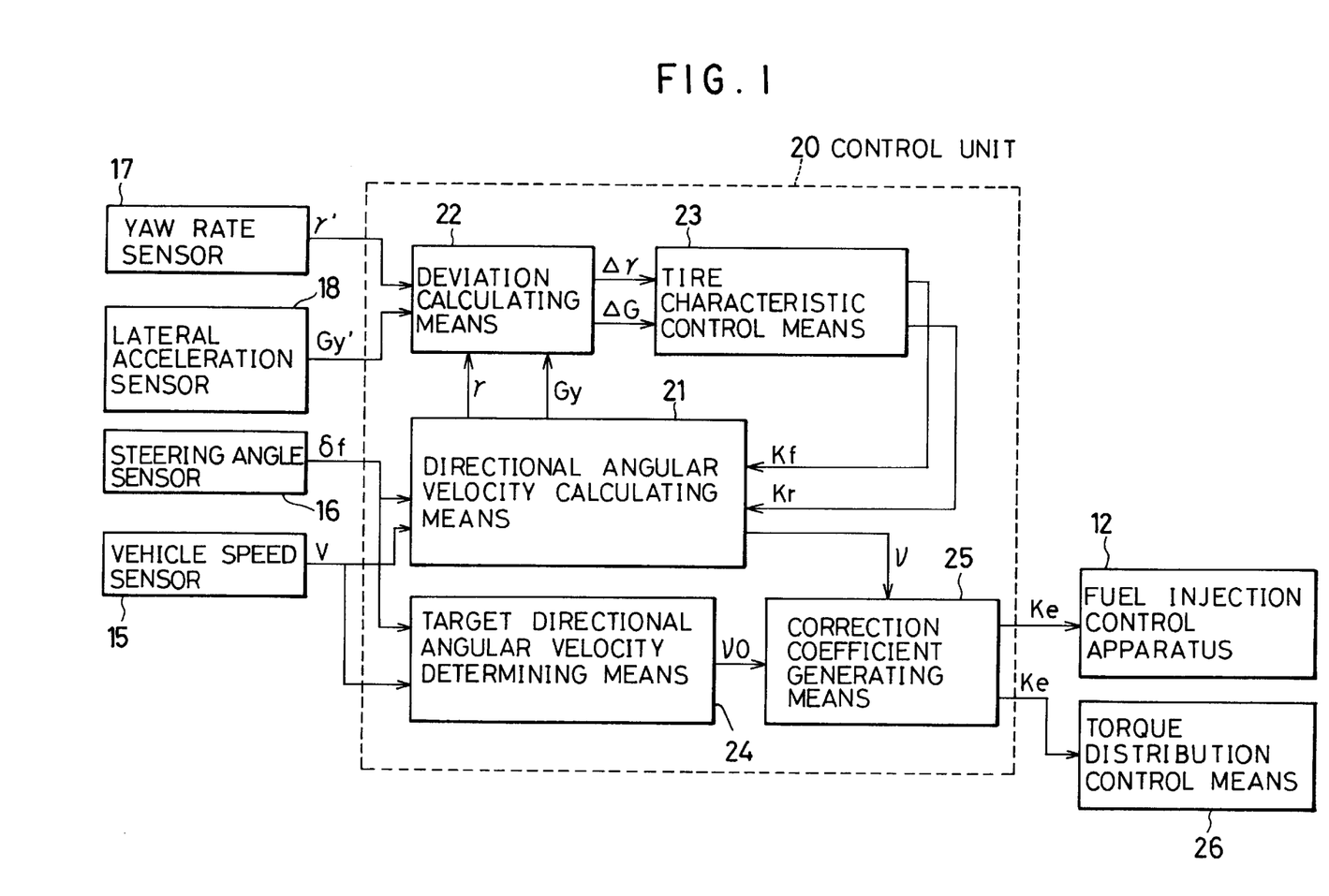
FIG. 1 is a block diagram showing an embodiment of a driving force control system for a vehicle according to the present invention.

Based on the abovementioned basic principle, the control system as shown in FIG. 1 will be described.

The control unit 20 includes directional angular velocity calculating means 21 to which the steering angle δf, the vehicle speed V and the estimated cornering powers Kf, Kr of front and rear wheels are inputted. These parameters constitute an adaptive observation system according to the adaptive control theory. The important thing of this invention is that the yaw rate τ, the lateral acceleration Gy and the directional angular velocity ν are calculated by applying the abovementioned equations of motion, (8), (11) and (12) extendedly to the marginal region. Further, the yaw rate τ and the lateral acceleration Gy calculated in the directional angular velocity calculating means 21 are transmitted to deviation calculating means 22 wherein deviations Δτ and ΔG are calculated by subtracting the actual yaw rate τ' and actual lateral acceleration Gy' from the calculated yaw rate τ and calculated lateral acceleration Gy respectively.

The deviation Δτ of the yaw rate and the deviation ΔG of the lateral acceleration are inputted to tire characteristic control means 23 in which the cornering powers Kf, Kr of the front and rear wheels are estimated based on these deviations Δτ and ΔG. That is to say, here, in a case where the actual lateral acceleration Gy' is decreased and ΔG is positive, since it is judged that the vehicle is drifting out or spinning in the marginal area, both the cornering powers Kf and Kr should be reduced. On the other hand; in a case where ΔG is negative, since it is judged that the vehicle is in tuck-in, both Kf and Kr should be increased. In a case where the actual yaw rate τ' is reduced and Δτ is positive, judging that the vehicle is drifting out, the cornering power Kf of the front wheels should be reduced and Kr of the rear wheels should be increased. In a case where the actual yaw rate τ' is increased and Δτ is negative, judging that the vehicle is spinning, Kf of the front wheels should be increased and Kr of the rear wheels should be reduced. How the cornering powers Kf, Kr are corrected according to the state of both deviations Δτ, ΔG is summarized in the following Table 1:

TABLE 1

| Kf | Kr | |
| --- | --- | --- |
| Reduce | Reduce | If ΔG > 0 |
| Increase | Increase | If ΔG < 0 |
| Reduce | Increase | If Δγ > 0 |
| Increase | Reduce | If Δγ < 0 |

The cornering powers Kf, Kr corresponding to drift-out or spinning of the vehicle in the marginal region are determined correctly every moment by reducing or increasing the cornering powers previously obtained by a predetermined increment according to the Table 1.

Further, the control unit 20 has target directional angular velocity determining means 24 for determining a target directional angular velocity ν0 corresponding to the steering angle δf and the vehicle speed V of the moment. That is to say, the target directional angular velocity ν0 is determined by using the aforementioned equations of motion (8), (11) and (12). When solving these equations, the cornering powers Kf, Kr of the parameters thereof are assumed to be a constant value on the high friction coefficient road respectively.

Figure 4:
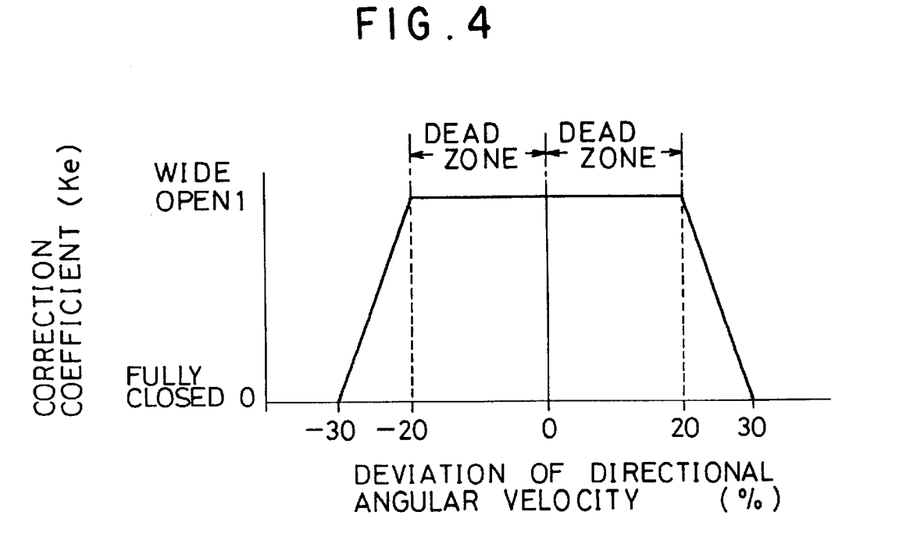
FIG. 4 is a diagram showing the relationship between a correction coefficient of engine output and a deviation ratio of an angular velocity of course direction from a target angular velocity of course direction.

The directional angular velocity ν and the target directional angular velocity ν0 are inputted to correction coefficient generating means 25 wherein the state of deviation of the vehicle from its intended course is judged from the difference between the calculated directional angular velocity ν and the target directional angular velocity ν0 and a control signal for controlling the engine power is outputted therefrom, namely a correction coefficient Ke for correcting the engine power is calculated. The correction coefficient Ke is determined for example as shown in FIG. 4, as a function of the deviation ratio e, where e=(ν−ν0)/ν0.

Specifically in this embodiment, when the vehicle trace comes outside of its intended course, ν becomes smaller than ν0 (ν<ν0) and the deviation ratio e becomes negative. On the other hand, when the vehicle trace comes inside of its intended course, ν becomes larger than ν0 (ν>ν0) and the deviation ratio e becomes positive. When the deviation ratio exceeds 20% on the positive or negative sides, the correction coefficient Ke is so determined as being reduced according to an increase or decrease of the deviation ratio. The signal of the correction coefficient Ke is outputted to the fuel injection control apparatus 12 for correcting the fuel injection amount Tp. That is to say, if Ke is 1.0, no correction is made on the fuel injection amount Tp, and if Ke becomes 0, the fuel injection amount Tp is corrected to the minimum value for example.

Next, the function of this embodiment will be described.

When the vehicle is operated, the engine 2 supplies power to the front wheels 8 through the transmission 4 and the differential 6. Supplied power is controlled by controlling the fuel injection amount Tp of the fuel injector 11.

Then, in the directional angular velocity calculating means 21 of the control unit 20, the yaw rate τ, the lateral acceleration Gy and the directional angular velocity ν are calculated and further, in the deviation calculating means 22, the deviations Δτ and ΔG are calculated based on those calculated yaw rate τ and lateral acceleration Gy and based on those detected actual yaw rate τ' and actual lateral acceleration Gy'. Further, in the tire characteristic control means 23, the cornering powers Kf, Kr of front and rear wheels 8, 9 are estimated respectively according to the control method based on the adaptive control theory. Finally, in the directional angular velocity calculating means 21, the directional angular velocity ν is calculated and the state of deviation of the vehicle from its intended course is always watched.

When the vehicle runs on the road with a dried surface, namely the high friction coefficient road, since the grip condition of tire is sufficient, the calculated yaw rate τ and lateral acceleration Gy coincides with the actual yaw rate τ' and lateral acceleration Gy' approximately. Because of this, the cornering powers Kf, Kr which are estimated in the tire characteristic control means 23 are those which the tire posseses originally and therefore the directional angular velocity ν coincides with the target directional angular velocity ν0 approximately. Consequently, the correction coefficient Ke for correcting the engine power becomes 1.0 according to the map shown in FIG. 4 and thus the engine power is not corrected.

On the other hand, when the vehicle makes a turn with acceleration on the low friction coefficient road, the side force of the front drive wheel 8 becomes small and as a result the vehicle gets in the situation where a side slip first occurs on the front wheel side. When actually the front wheel 8 exceeds a grip limit of tire and slips outward in the lateral direction, as illustrated in FIG. 5, the vehicle trace n comes outside of the target course m. At this moment, both deviations ΔG and Δτ become positive due to decreases of the actual lateral acceleration Gy' and the actual lateral acceleration τ' and as a result of this the cornering powers Kf, Kr of front and rear wheels are corrected so as to give a larger decrease to the cornering power Kf of the front wheel. As a result of this, the directional angular velocity ν calculated in the directional angular velocity calculating means 21 becomes a small number abruptly responding to the situation of the vehicle, "drift out", on the low friction coefficient road. Further, when the deviation ratio e of the directional angular velocity ν from the target directional angular velocity ν0 exceeds −20%, the correction coefficient Ke is determined to be less than 1.0, namely so as to reduce engine power, according to the map shown in FIG. 4.

Consequently, the fuel injection amount Tp of the fuel injector 11 is reduced by this correction coefficient Ke and due to this the drive force of the front wheel 8 is reduced. Then, the side force of tire on the front wheel 8 is increased with a decrease of the drive force and resultantly the side slip of the front wheel 8 is restrained. Thus, the vehicle 1 is prevented from drifting out and the vehicle trace n is corrected so as to coincide with the target course m.

When the vehicle 1 is prevented from drifting out, the actual lateral acceleration Gy' is restored and the actual yaw rate τ' is increased. Then, the calculated directional angular velocity ν is also increased. Further, engine power is gradually returned to the original state as the deviation ratio e is decreased. Thus, the vehicle 1 can be smoothly turned so as not to deviate from the trace determined based on the turning characteristic on the high friction coefficient road even at the marginal region on the low friction coefficient road.

On the other hand, in case of the rear wheel drive vehicle, when the vehicle makes a turn with acceleration on the low friction coefficient road, a lateral slip takes place at the rear wheel first and the vehicle 1 comes near spinning. When the vehicle trace n comes inside of the target course m and it starts spinning, the directional angular velocity ν is calculated in the same manner as mentioned before. Further, when the deviation ratio e exceeds +20%, the correction coefficient Ke acts on the fuel injection control apparatus 12 so as to reduce engine power, whereby the vehicle can make a smooth turn even at the marginal region on the low friction coefficient road.

Further, in case of the four wheel drive vehicle capable of distributing torque between the front and rear wheels, the correction coefficient Ke can be used for varying a ratio of torque distribution between the front and rear wheels by torque distribution control means 26. For example, when the vehicle drifts out, the correction coefficient Ke may be changed so as to distribute greater torque to the rear wheel than to the front wheel and when it spins, the coefficient Ke may be changed so as to distribute larger torque to the front wheel than to the rear wheel.

In summary, the driving force control system according to the present invention comprises directional angular velocity calculating means for calculating a directional angular velocity which indicates the state of deviation of the vehicle from its intended course, deviation calculating means for calculating a deviation of the calculated yaw rate from the detected yaw rate and a deviation of the calculated lateral acceleration from the detected lateral acceleration, tire characteristic control means for estimating the cornering powers of front and rear wheels based on the deviations calculated by the deviation calculating means, target directional angular velocity determining means for determining a target angular velocity based on the actual steering angle and the actual vehicle speed, and correction coefficient generating means for generating a correction coefficient to correct engine power so as to control the driving force of wheels.

Since the driving force control system thus constituted always watches the positional deviation of the vehicle from its driving course and, when that deviation exceeds a predetermined limit, the driving force is controlled so as to cancel the deviation, the vehicle can be prevented from drifting out or spinning even in the marginal condition on the low friction coefficient road.

What is claimed is:

1. A driving force control system of a vehicle having an engine, a fuel injector, a front wheel and a rear wheel for controlling a driving force so as to control a behavior of said vehicle during running, comprising:

directional angular velocity calculating means for estimating a directional angular velocity of said vehicle;

target directional angular velocity determining means for determining a target directional angular velocity of said vehicle;

correction coefficient generating means for generating a correction coefficient based on said directional angular velocity and said target directional angular velocity; and torque distribution control means for distributing a torque between said front wheel and said rear wheel based on said correction coefficient.

2. A driving force control system of a four wheel drive vehicle having an engine, a fuel injector, a front wheel, a rear wheel for controlling a driving force so as to control a behavior of said vehicle during running by controlling a torque distribution ratio between said front wheel and said rear wheel, comprising:

a yaw rate sensor for detecting an actual yaw rate of said vehicle;

a lateral acceleration sensor for detecting an actual lateral acceleration of said vehicle;

a steering angle sensor for detecting a steering angle of said vehicle;

a vehicle speed sensor for detecting a vehicle speed;

directional angular velocity calculating means for calculating a target yaw rate, a target lateral acceleration and for estimating a directional angular velocity by using equations of motion;

deviation calculating means for calculating a deviation of said target yaw rate from said actual yaw rate based on said target yaw rate and said actual yaw rate and a deviation of said target lateral acceleration from said actual lateral acceleration based on said target lateral acceleration and said actual lateral acceleration;

tire characteristic control means for estimating a cornering power of said front wheel and a cornering power of said rear wheel based on said deviation of said target yaw rate from said actual yaw rate and said deviation of said target target acceleration from said actual lateral acceleration;

said directional angular velocity calculating means calculates said target yaw rate, said target lateral acceleration and estimates said directional angular velocity by using said equations of motion parameterizing said steering angle, said vehicle speed, said cornering power of said front wheel and said cornering power of said rear wheel;

target directional angular velocity determining means for determining a target directional angular velocity by using said equations of motion parameterizing said steering angle, said vehicle speed, a predetermined cornering power of said front wheel and a predetermined cornering power of said rear wheel;

correction coefficient generating means for generating a correction coefficient based on said directional angular velocity and said target directional angular velocity; and torque distribution control means for determining a torque distribution ratio between said front wheel and said rear wheel based on said correction coefficient.

3. The driving force control system according to claim 2, wherein said correction coefficient is a coefficient determined according to a deviation ratio obtained by dividing a deviation of said directional angular velocity from said target angular velocity and said coefficient corresponds to said torque distribution ratio between said front wheel and said rear wheel.

4. The driving force control system according to claim 2, wherein said predetermined cornering powers of front and rear wheels are derived from the tire characteristics on a road with a high friction coefficient.

5. A method of controlling a driving force of a vehicle having an engine, a fuel injector, a front wheel and a rear wheel, comprising the steps of:

estimating a directional angular velocity of said vehicle;

determining a target directional angular velocity of said vehicle;

generating a correction coefficient based on said directional angular velocity and said target directional angular velocity; and distributing a torque between said front wheel and said rear wheel based on said correction coefficient.

6. A method of controlling a driving force of a four wheel drive vehicle having an engine, a fuel injector, a front wheel and a rear wheel, comprising the steps of:

detecting an actual yaw rate of said vehicle;

detecting an actual lateral acceleration of said vehicle;

detecting a steering angle of said vehicle;

detecting a vehicle speed;

calculating a target yaw rate, a target lateral acceleration and estimating a directional angular velocity by using equations of motion;

calculating a deviation of said target yaw rate from said actual yaw rate based on said target yaw rate and said actual yaw rate and a deviation of said target lateral acceleration from said actual lateral acceleration based on said target lateral acceleration and said actual lateral acceleration;

estimating a cornering power of said front wheel and a cornering power of said rear wheel based on said deviation of said target yaw rate from said actual yaw rate and said deviation of said target lateral acceleration from said actual lateral acceleration;

determining a target directional angular velocity by using said equations of motion parameterizing said steering angle, said vehicle speed, a predetermined cornering power of said front wheel and a predetermined cornering power of said rear wheel;

generating a correction coefficient based on said directional angular velocity and said target directional angular velocity; and determining a torque distribution ratio between said front wheel and said rear wheel based on said correction coefficient.

7. A driving force control system of a vehicle having an engine mounted on said vehicle, fuel injection control means operatively connected to said engine for controlling a fuel injection amount thereto via an injector, a differential connected to said engine via a clutch for changing torque distribution between a front wheel and a rear wheel of the vehicle, a yaw rate sensor mounted on said vehicle for detecting an actual yaw rate and for generating a yaw rate signal, a lateral acceleration sensor for sensing an actual lateral acceleration amount in a lateral direction of said vehicle and for producing an acceleration signal, a steering angle sensor mounted on said vehicle for detecting steering angle of said front wheel and for generating a steering angle signal, and a vehicle speed sensor mounted on said vehicle for sensing vehicle speed and for producing a vehicle speed signal, comprising:

target directional angular velocity determining means responsive to said steering angle signal and said vehicle speed signal for setting a target directional angular velocity based upon standard turning characteristics corresponding to a friction coefficient of a surface of a road and for producing a target directional angular velocity signal;

deviation value calculating means responsive to said yaw rate signal and said acceleration signal for calculating a deviation value by subtracting each of said actual yaw rate and said actual lateral acceleration amount from a predetermined value and for generating a deviation signal;

tire characteristic control means responsive to said deviation signal for setting a cornering power of said front and rear wheels in a threshold range and for outputting a cornering power signal;

directional angular velocity calculating means responsive to said steering angle signal and said vehicle speed signal and said cornering power signal for calculating a calculated directional angular velocity of said vehicle and for producing a calculated directional angular velocity signal;

correction coefficient generating means responsive to said calculated directional angular velocity signal and said target directional angular velocity signal for generating a correction coefficient indicating a deviation from a desired course of said vehicle and for outputting a correction coefficient signal; and torque distribution control means responsive to said correction coefficient signal for controlling the torque distribution between said front wheel and said rear wheel by said differential and said clutch so as to provide optimum driving conditions of the vehicle by improving cornering and traction.

8. The driving force control system according to claim 7, wherein:
  said directional angular velocity calculating means uses an equation of motion with parameters of said steering angle, said vehicle speed and said cornering power to derive said calculated directional angular velocity.

9. The driving force control system according to claim 7, wherein:
  said cornering power is derived from tire frictional characteristics against the road with a high frictional coefficient.

10. The driving force control system according to claim 7, wherein:
  said correction coefficient generating means determines said correction coefficient for changing said torque distribution, and said correction coefficient is determined by a deviation ratio in accordance with a distribution ratio between said front wheel and said rear wheel.

11. A method for driving force control of a vehicle having an engine mounted on said vehicle, fuel injection control means operatively connected to said engine for controlling a fuel injection amount thereto via an injector, a differential connected to said engine via a clutch for changing torque distribution between a front wheel and a rear wheel of the vehicle, the method comprising the steps of:
  calculating a directional angular velocity of said vehicle;
  setting a target directional angular velocity based upon standard turning characteristics corresponding to a friction coefficient of a road surface;
  changing said torque distribution between said front wheel and said rear wheel so as to provide an optimum driving condition of said vehicle by improving corning and traction.

12. The method for driving force according to claim 11, further comprising the steps of
  detecting an actual yaw rate,
  sensing an actual acceleration amount in a lateral direction of said vehicle,
  computing a deviation value by subtracting each of said actual yaw rate and said actual lateral acceleration amount from a predetermined value,
  determining a cornering power of the front and rear wheels in a threshold range from said deviation value, and wherein
  said calculating step calculates said directional angular velocity from said cornering power.

13. The method for driving force control according to claim 12, further comprising the steps of
  detecting a steering angle of said front wheel,
  sensing a vehicle speed, and wherein
  said calculating step uses an equation of motion with parameters of said steering angle, said vehicle speed and said cornering power to derive said directional angular velocity.

* * * * *